(12) United States Patent
Giro Amigo

(10) Patent No.: US 9,126,722 B2
(45) Date of Patent: Sep. 8, 2015

(54) PROCESS AND MACHINE FOR THE FORMATION AND THE FILLING OF BAGS

(75) Inventor: Ezequiel Giro Amigo, Badalona (ES)

(73) Assignee: Girnet Internacional, S.L., Badalona (ES)

( * ) Notice: Subject to any disclaimer, the term of this patent is extended or adjusted under 35 U.S.C. 154(b) by 1451 days.

(21) Appl. No.: 12/640,269

(22) Filed: Dec. 17, 2009

(65) Prior Publication Data

US 2010/0154359 A1    Jun. 24, 2010

(30) Foreign Application Priority Data

Dec. 18, 2008 (ES) .................................. 200803593

(51) Int. Cl.
*B65B 51/00* (2006.01)
*B65D 30/06* (2006.01)
*B65B 9/15* (2006.01)
(Continued)

(52) U.S. Cl.
CPC . *B65D 29/04* (2013.01); *B65B 9/15* (2013.01); *B65B 25/04* (2013.01); *B65B 51/04* (2013.01); *B65B 51/146* (2013.01); *B65B 51/225* (2013.01); *B65B 61/14* (2013.01); *B65D 33/10* (2013.01); *B29C 65/08* (2013.01); *B65B 25/048* (2013.01)

(58) Field of Classification Search
CPC .................................. B65B 61/14; B65B 1/04
USPC ......... 53/459, 417, 413, 567, 139.1, 138.3–4, 53/478, 483, 419, 441, 138.2–3, 138.4, 53/576; 383/8, 16, 21, 117; 493/189, 269, 493/254
See application file for complete search history.

(56) References Cited

U.S. PATENT DOCUMENTS 2,834,164 A * 5/1958 Irmscher .......................... 53/413
3,507,194 A * 4/1970 Schwarzkopf ................ 493/196
(Continued)

FOREIGN PATENT DOCUMENTS

DE    11 84 267 B    12/1964
DE    44 21 366 A1    12/1995
(Continued)

OTHER PUBLICATIONS

Mar. 31, 2010, European Search Report and European Search Opinion.
(Continued)

*Primary Examiner* — Nathaniel Chukwurah
(74) *Attorney, Agent, or Firm* — Sughrue Mion, PLLC

(57) ABSTRACT

The present invention relates to a process for the formation and the filling of bags, applicable to tubular mesh bags closed at their two ends and provided with a handle formed by a plastic strip attaching said ends, comprising the operations of constricting a mesh section of a portion of mesh previously drawn from a storage and attaching it to a section of the strip of a portion of strip previously drawn from its storage, determining at least one securing area between both sections of the mesh and of the first strip, to make a first closed end of the bag to be formed, still empty, and a second end of the immediately previous bag still in formation, already filled; and of transversely cutting both attached sections of the mesh and of the first strip so that the first closed end is gripped by the first strip during the entire following process of filling and formation of said bag, including operations of drawing new portions of mesh and of strip from the corresponding storages and of filling of the bag before closing its second end.

8 Claims, 5 Drawing Sheets

(51) Int. Cl.
*B65B 25/04* (2006.01)
*B65B 51/04* (2006.01)
*B65B 51/14* (2006.01)
*B65B 51/22* (2006.01)
*B65B 61/14* (2006.01)
*B65D 33/10* (2006.01)
*B29C 65/08* (2006.01)

(56) References Cited

U.S. PATENT DOCUMENTS

| | | | |
|---|---|---|---|
| 4,090,897 A | | 5/1978 | Minick |
| 4,373,979 A | | 2/1983 | Planeta |
| 4,403,637 A | | 9/1983 | Rivelles Sabater et al. |
| 4,490,960 A | * | 1/1985 | Klemesrud ............ 53/138.1 |
| 4,753,538 A | | 6/1988 | Jordá |
| 5,192,133 A | | 3/1993 | Juel et al. |
| 5,836,695 A | | 11/1998 | Hanson |
| 6,088,999 A | * | 7/2000 | Olaechea ............... 53/417 |
| RE36,876 E | | 9/2000 | Daniels et al. |
| 6,205,747 B1 | | 3/2001 | Paniagua Olaechea |
| 6,237,533 B1 | | 5/2001 | Rodriguez |
| 6,574,940 B2 | * | 6/2003 | Dauder Guardiola ....... 53/134.1 |
| 8,167,488 B2 | | 5/2012 | Giro Amigo |
| 2008/0273817 A1 | | 11/2008 | Giro Amigo |

FOREIGN PATENT DOCUMENTS

| | | |
|---|---|---|
| EP | 0047544 A1 | 3/1982 |
| EP | 0677449 A1 | 10/1995 |
| EP | 0 823 376 A1 | 2/1998 |
| EP | 1988027 A1 | 11/2008 |
| ES | 0207717 U | 3/1976 |
| ES | 1027615 U | 9/1994 |
| ES | 1027802 U | 10/1994 |
| ES | 0220757 U | 1/1995 |
| ES | 2169787 T3 | 2/1998 |
| ES | 1050533 U | 4/2002 |
| ES | 0172093 U | 5/2012 |
| GB | 1 491 444 A | 11/1977 |

OTHER PUBLICATIONS

European Search Report for EP 08380082, dated Jul. 31, 2008.
European Search Report for EP 09169673, dated Oct. 13, 2009.
Spanish Search Report for ES 200701187, dated Oct. 8, 2009.

* cited by examiner

PROCESS AND MACHINE FOR THE FORMATION AND THE FILLING OF BAGS

TECHNICAL FIELD OF THE INVENTION

The invention relates to a process for the formation and the filling of bags, particularly applicable to tubular mesh bags closed at their two ends and provided with a handle and/or a strip for the attachment between said ends.

The invention also relates to a machine for putting the process of the invention into practice.

BACKGROUND OF THE INVENTION

Multiple embodiments of bags for packaging and marketing food products are already known. Breathable bags intended for packaging and marketing fruit and vegetable products such as citrus fruits, root vegetables or the like are particularly known. These bags, unlike conventional plastic bags, allow the product to breathe while at the same time they extend its storage time and enable the buyer to inspect the appearance, touch and smell of their contents.

The object of the present invention is to provide a process and a machine for the automatic formation and filling of a particular type of bag, specifically of bags formed from a longitudinal portion of tubular mesh the ends closed by constriction of which are attached by means of at least one oblong and flexible element, such as a plastic strip, acting as a handle. A bag of this type is described in patent document EP 1988027.

DISCLOSURE OF THE INVENTION

The process according to the invention is essentially characterized in that, from respective tubular mesh storages and of at least one first continuous strip for the formation of the handle, it comprises the operations of constricting a mesh section of a portion of mesh previously drawn from the tubular mesh storage and inseparably attaching it to a section of the first strip of a strip section previously drawn from the strip storage, determining at least one securing area between both sections of the mesh and of the first strip, to make a first closed end of the bag to be formed, still empty, and a second end of the immediately previous bag still in formation, already filled; drawing from the tubular mesh storage a new empty portion of tubular mesh; transversely cutting both attached sections of the mesh and of the first strip so that on both sides of the cut made there is a securing area, or a longitudinal section thereof, sufficient for assuring that the accidental opening of the bags does not occur, the already formed full bag being separated from the following bag now in formation, the first closed end of which is gripped by the first strip during the entire following process of filling and formation of said bag; drawing from the strip storage a new portion of the first strip with a length smaller than that of the empty portion of tubular mesh drawn; filling the new empty portion of mesh contiguous to the first closed end of the bag in formation with the products to be packaged, through the non-constricted end of the bag in formation and such that the introduced product forces the drawn portion of tubular mesh to adopt a U-shape due to the effect of the weight of the products, most or all of the products being arranged at a level below the first closed end of the mesh, which remains gripped by the first strip; constricting a new section of tubular mesh drawn from the mesh storage and inseparably attaching it to a new section of the first strip drawn from the strip storage, determining at least one new securing area between both sections of the mesh and of the strip, to make a first closed end of the following bag to be formed, still empty, and a second closed end of the bag still in formation, already full; drawing from the tubular mesh storage another empty portion of tubular mesh, corresponding to the length of the following bag to be formed; and transversely cutting the new attached sections of the mesh and of the first strip so that on both sides of the cut made there is a securing area, or a longitudinal section thereof, sufficient for assuring that the accidental opening of the bags does not occur, the already formed full bag being separated from the following bag now in formation, the first closed end of which is suspended from the first strip during the entire following process of filling and formation of said bag.

According to another feature of the invention, there is a third storage of a second continuous strip, the process is according to the operations of claim 2.

According to a particularly interesting variant, the length of the portion of the first strip drawn in operation of drawing a new portion of strip from its corresponding storage, is different from the length of the portion of the second strip also drawn from its corresponding storage.

Preferably, the length of the portion of the first strip drawn is smaller than that of the second strip, said first strip being arranged between the constricted mesh and the second strip.

In relation to the operations of drawing portions of mesh from the mesh storage, the variants described in claims 5 and 6 are contemplated.

According to another feature of the invention, the attachments carried out between the sections of mesh and of strip or strips are carried out by welding by means of melting the materials forming the mesh and the strip or strips.

In a variant of the invention, in each attachment operation two welds separated from one another are made, two securing areas between the mesh and the strip or strips being determined.

According to this variant of the invention, the mesh and the strips attached are cut through a point comprised between the two welds.

The machine for putting the process according to the invention into practice comprises an mesh extractor for stretching longitudinal portions of mesh from a tubular mesh storage; at least two strip dispensers for drawing longitudinal portions of strip from respective strip storages, arranged such that both sections of the drawn portions of strip are hanging juxtaposed and opposite to a section of the drawn mesh; a joint compression and transverse constriction device for respective longitudinal sections of mesh and of the strips; an attachment device for inseparably attaching the compressed sections of mesh and of the strips; a cutting device for transversely cutting the attachment of both longitudinal sections of mesh and of the strips, separating the first closed end of a bag in formation, which is gripped by the two strips and suspended from the end of the shortest drawn strip, from the second closed end of a formed bag; and filling means for filling the chosen bags in formation the first end of which has been closed and remains gripped by the two strips and suspended from the end of the shortest drawn strip, the mesh extractor and the strip dispensers being suitable for acting in a synchronised manner with the constriction, attachment and cutting devices, such that between every two consecutive constriction, attachment and cutting operations, corresponding sections of mesh and strips are drawn and a bag in formation is filled.

According to another feature of the machine, the mesh extractor device comprises a drawing bar, transversely arranged with respect to the mesh, movable according to a back and forth movement on a horizontal plane.

In a variant of the invention, the joint compression and transverse constriction device for the longitudinal section of drawn mesh and of the longitudinal section of strip comprises a set of constricting plates, determining a recess at a considerably right angle, and a central compressor element, both progressively and consecutively drivable towards corresponding end-of-action stops for collecting and dragging the mesh in their movement until reaching the strip, in a first step of action in which the set of plates intervenes, and for applying by pressure the mentioned longitudinal sections of mesh and of strip against a corresponding limit stop, in a second step of action in which the central compressor element intervenes.

According to another feature of the machine according to this variant of the invention, the set of plates and the central compressor are assembled on a carriage, movable with respect to the frame of the machine according to a horizontal back and forth movement, which are longitudinally movable in the direction of movement of the carriage, subjected to the action of respective elastic means forcing them to adopt respective initial and predetermined positions of action, such that when the carriage advances towards the end-of-action stops the set of plates and the central compressor act sequentially, their movement likewise being successively stopped when they reach the end-of-action stops when the carriage advances towards them, successively recovering their initial position when the carriage moves back in each cycle, until reaching said initial position, due to the effect of the elastic means.

In a variant of the invention, the attachment device is also assembled on the carriage, longitudinally movable in the direction of movement of the carriage.

According to another feature, the carriage is provided with an essentially horizontal and flat upper platform, immediately below which there is arranged a cavity housing the drawing bar, said upper platform thus being suitable for carrying out the alternate closing and opening of the aperture for unloading the filling means, in each operative cycle.

According to other features of the machine of the invention, each of the strip storages is provided with at least one main storage roller, with several tension rollers and with a braking device for retaining the bag in formation at one of its ends during the process of formation and filling.

Preferably, the filling means of the products to be packaged, the tubular mesh storage and the strip storages, are assembled fixed on the frame of the machine.

BRIEF DESCRIPTION OF THE DRAWINGS

The attached drawings show, by way of a non-limiting example, a sequence of the operations comprised by the process according to a variant of the invention, several schematic views of the machine for putting the process into practice, in which the components thereof adopt different positions according to the operation which is being carried out, and a bag obtainable by means of the process according to the invention. In said drawings.

DETAILED DESCRIPTION OF THE DRAWINGS

Figure 1:
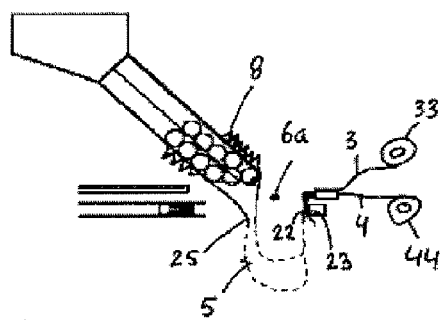
FIGS. 1 to 9 show illustrations of a variant of the process according to the invention, which complete an operative cycle for the formation of a bag.
Figure 7:
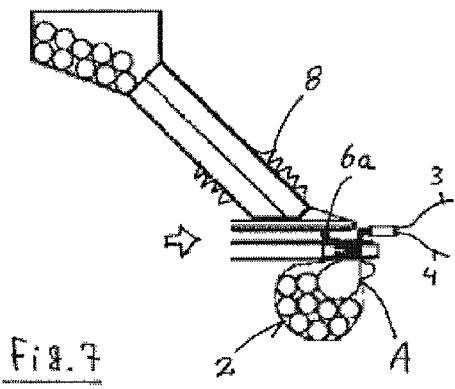
Figure 8:
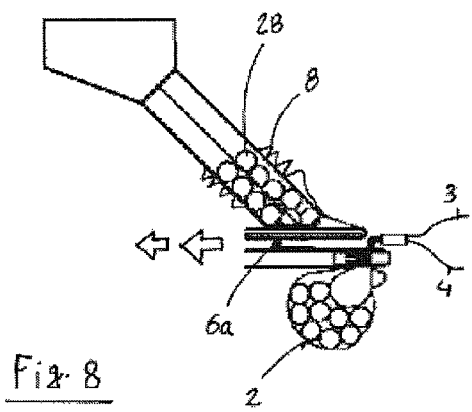
Figure 9:
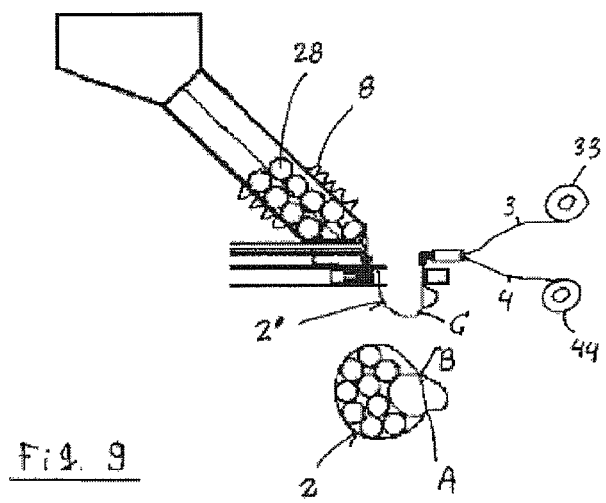

The process depicted in FIGS. 1 to 11 consists of the repeated performance of a set of operations in which a tubular mesh 5 and two plastic strips 3 and 4 are jointly manipulated to make a tubular bag 2 (see FIGS. 7 to 9) formed from an empty portion of mesh 5, drawn and separated from a tubular mesh storage 8, the constricted ends of which are attached to the corresponding ends of respective plastic strips 3 and 4, with a different length and obtained from corresponding continuous strip storages 33 and 44 (schematically depicted in FIGS. 1 and 9).

Figure 14:
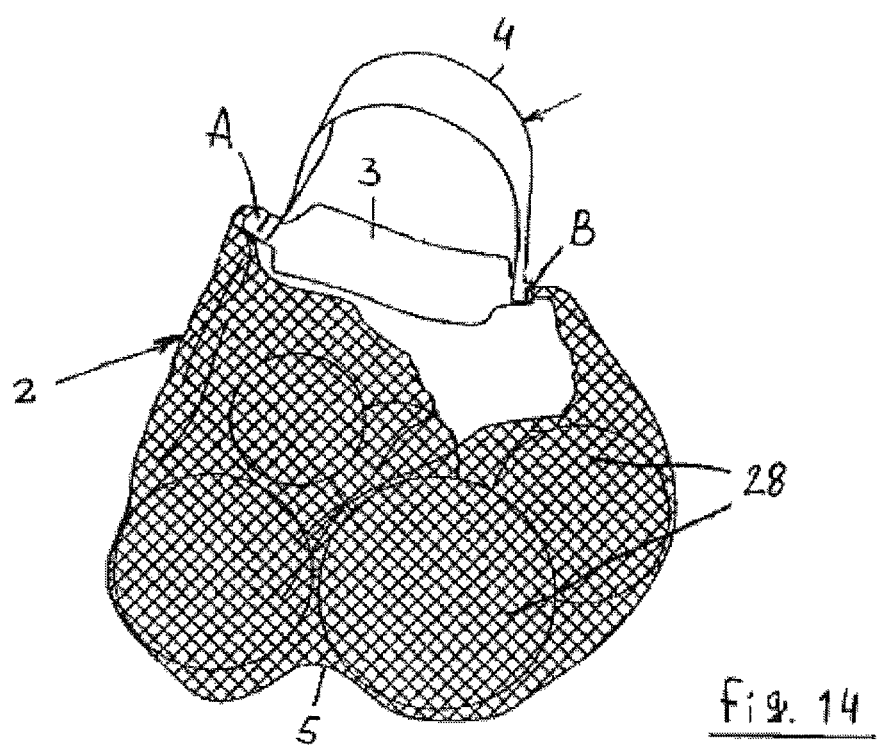
FIG. 14 shows a depiction of a bag obtainable by means of the process and the machine of the invention.

The bag 2 in question is depicted in detail in FIG. 14, in which it is observed how the closed ends A and B of the bag 2 are solidly fixed to the ends of respective flexible strips 3 and 4, from which the strip 4 acts as a handle for holding the bag 2. For the purpose of maintaining the strip 4 acting as a handle upright even when the bag 2 is supported on the surface of a counter, a shelf or the like, it is observed that the strip 3 secured to the closed ends A and B has a length considerably smaller than the strip 4. As shown in FIG. 14, this laminar strip 3 prevents the separation of the closed ends A and B and causes the strip 4 acting as a handle, provided with the sufficient consistency, to not be tensed and remain upright adopting a curve configuration, facilitating its gripping by the user.

Figure 2:
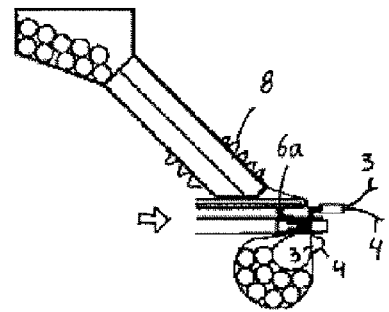

The process depicted in FIGS. 1 to 11 is as follows:

Starting from the fictitious situation depicted in FIG. 1, in which a portion of mesh 5 has been previously drawn from the mesh storage 8, the operation depicted in FIG. 2 is carried out, which consists of consisting a section 25 of the drawn mesh and compressing it together with corresponding sections 22 and 23 of a first and a second plastic strip 3 and 4, previously drawn from the corresponding storages 33 and 44 in the form of strip rolls.

Figure 10:
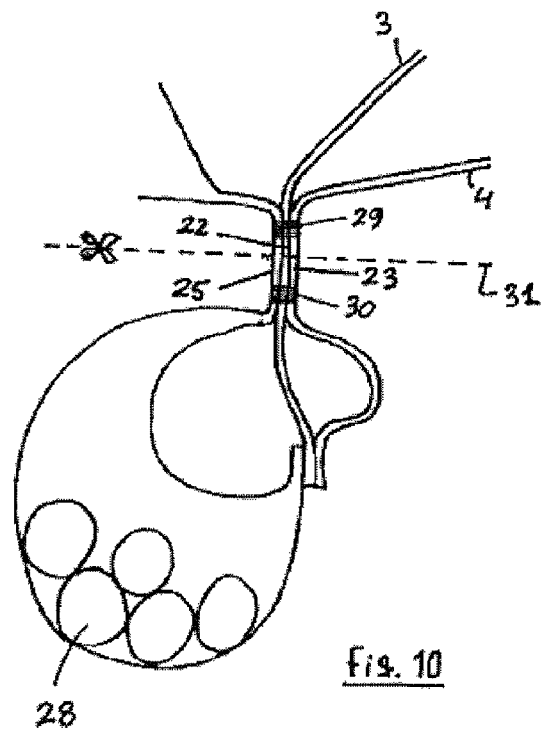
FIGS. 10 and 11 show detailed views of the area of the attachment between the mesh and the strips from which the bags are obtained, in the steps of formation of a bag illustrated in FIGS. 2 and 5, respectively.

The section 25 of the mesh and the sections 22 and 23 of the strips 3 and 4 being compressed, said compressed sections of the mesh 5 and of the strips 3 and 4 are solidly and inseparably attached. The attachment takes place in the embodiment by melting the materials forming the mesh 5 and the strips 3 and 4, and more specifically in each attachment operation two welds separated from one another are made, two securing areas 29 and 30 between the mesh 5 and the strips 3 and 4 being determined, as shown in FIG. 10. With this attachment a first end A of the bag to be formed, still empty, and a second end of the immediately previous bag still in formation, already full, are irreversibly attached.

The process according to the invention contemplates the possibility of carrying out the attachment by carrying out a single weld, a single securing area along a longitudinal section of the mesh 5 and the strips 3 and 4 being determined in this case. Alternatively, the attachment can be carried out by means of the use of attachment elements such as clamps or other conventional means.

Figure 3:
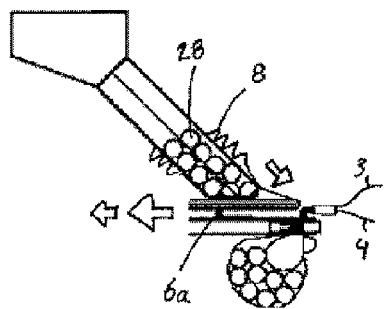

Simultaneously or subsequently to the attachment operation, the section 25 of the mesh and the sections 22 and 23 of the strips still being compressed or firmly secured, the operation depicted in FIG. 3 is carried out, consisting of drawing from the mesh storage 8 a new empty portion of tubular mesh as indicated by the arrow of said FIG. 3. This operation is carried out by means of the movement of the drawing bar 6a, as will be explained below, in the direction indicated by the horizontal arrows.

The length of drawn mesh can be correspond with the length of the bag to be formed, although the possibility is also contemplated that a portion of mesh with a length smaller than that of the bag in formation is drawn, in order to subsequently draw from the mesh storage a complementary portion of mesh for the formation of the bag when the operation of filling of the bag in formation is carried out. In this event, even the possibility that this complementary portion of mesh is drawn from the storage, without the intervention of mechanical means which draw the mesh, by the force that the product exerts on the previously drawn mesh when product falls onto it from a certain height, is provided.

Then, the attachment of the compressed sections is transversely cut. Said cut is carried out between the previously described two securing areas 29 and 30, the already formed full bag being separated from the following bag 2 now in formation, the first closed end A of which will remain secured to the strips 3 and 4 during the entire following process of filling and formation of said bag 2. In FIG. 10 of a detail, the dotted line 31 depicts the cutting line.

In the event that the attachment is carried out by means of a single weld, the transverse cut should be carried out through its mid point, or in any case such that on both sides of the cut made there is a securing area between the mesh 5 and the strips 3 and 4 large enough to assure that there is no accidental opening of the bag 2 once finished.

Figure 4:
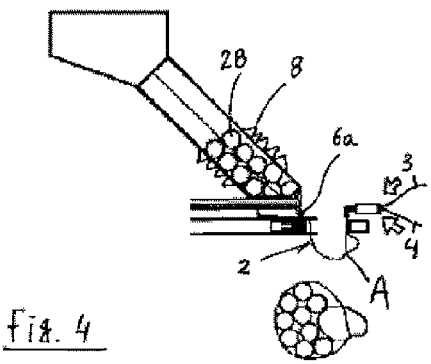
Figure 11:
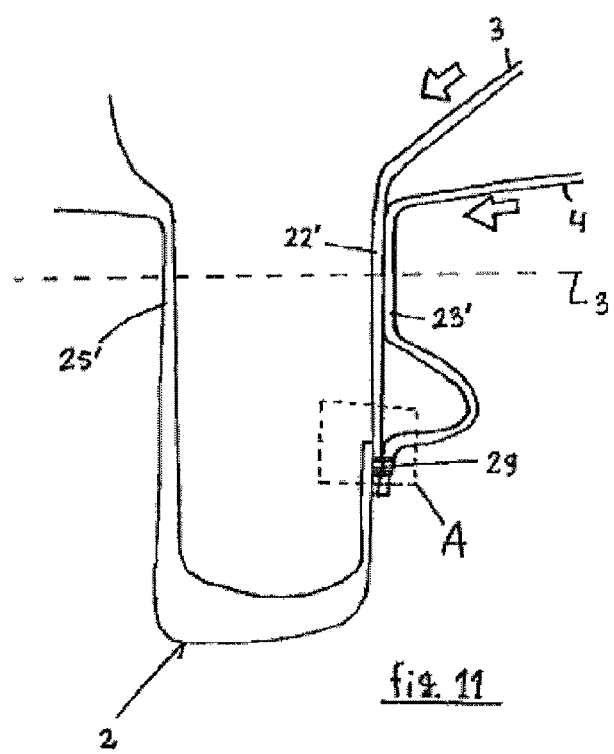

After the cutting operation, the operation of drawing from the corresponding storages 33 and 44 new portions of the first strip 3 and of the second strip 4 is carried out, as indicated by the arrows of FIGS. 4 and 11, for the formation of the handle, the length of the portion of drawn strip 4 being greater than that of the strip 3, for the purpose of obtaining a bag according to FIG. 14. It should be indicated that the length of the portion of drawn strip 4 being equivalent to that of the desired handle, the length of the portion of drawn strip 3 is smaller. As a result, the strip 3, which remains tensed due to the effect of the weight of the mesh and ahead of the products to be packaged, supports the weight of the bag 2 during manufacture. It is also important to indicate that the length of the strip 3 is smaller than that of the drawn portion of tubular mesh in the previous operation.

Figure 5:
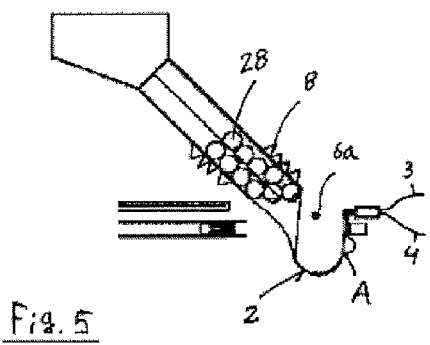
Figure 6:
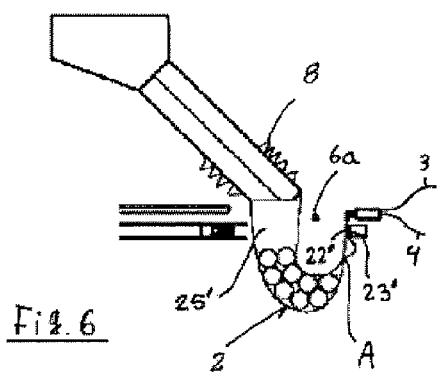

FIG. 5 shows how the devices which have carried out the operations of constricting and attaching the section of mesh 25 and the sections 22 and 23 of the strips 3 and 4, respectively, and of transversely cutting the attachment of said sections of mesh and strips, which devices will be described in detail below, occupy a retracted position, in which they allows the following operation, depicted in FIG. 6, to be carried out, which operation consists of filling the new empty portion of mesh contiguous to the already closed first end A of the bag 2 in formation with the products 28 to be packaged, through the non-constricted end of the bag in formation. It is observed in FIG. 6 that the introduced product forces the drawn portion of tubular mesh to adopt a U-shape and that most or all the products are arranged at a level below the first closed end (A) of the mesh which remains gripped by the first strip (3).

Once this situation is reached, the operations described in the present example are repeated but carried out, as shown in detail in FIG. 11, on a new section 25' of mesh, belonging to the new drawn portion of mesh, and new sections 22' and 23', respectively, of the strips 3 and 4, such that in the first place the new section 25' of the drawn mesh 5 is constricted and compressed together with the mentioned new sections 22' and 23' of the strips 3 and 4, separated from the sections 22 and 23 previously attached to the tubular mesh at a distance equal to the length of the portions drawn from the corresponding storages 33 and 44 of the strips 3 and 4. This situation is reflected in FIGS. 6 and 7. It is also observed that the drawn section 23' of the strip 4 is greater than the drawn section 22' of the strip 3.

Once the new section 25' of the mesh and the new sections 22' and 23' of the strips 3 and 4 are compressed, said compressed sections of the tubular mesh 5 and of the strips 3 and 4 are solidly and inseparably attached. The attachment takes place, as in the immediately previous attachment operation, by melting the materials forming the mesh 5 and the strips 3 and 4, and more specifically in each attachment operation two welds separated from one another are made, two new securing areas between the mesh 5 and the strips 3 and 4 being determined. With this attachment a first end C of the following bag to be formed (see FIG. 9) and the second end B of the bag still in formation, now full, are irreversibly closed.

Simultaneously or subsequently to this attachment operation, the new section 25' of the mesh and the new sections 22' and 23' of the strips 3 and 4 still being compressed or firmly secured, the operation depicted in FIG. 8 is carried out, consisting of drawing from the mesh storage 8 another empty portion of tubular mesh.

Then, the attachment of the compressed sections is transversely cut similarly to the previous cut, i.e., the cut being made between the previously described two new securing areas, the already formed full bag 2 being separated from the following bag 2' now in formation, the first closed end C of which will remain gripped by the strips 3 and 4 during the entire following process of filling and formation of said bag 2'.

Figure 12:
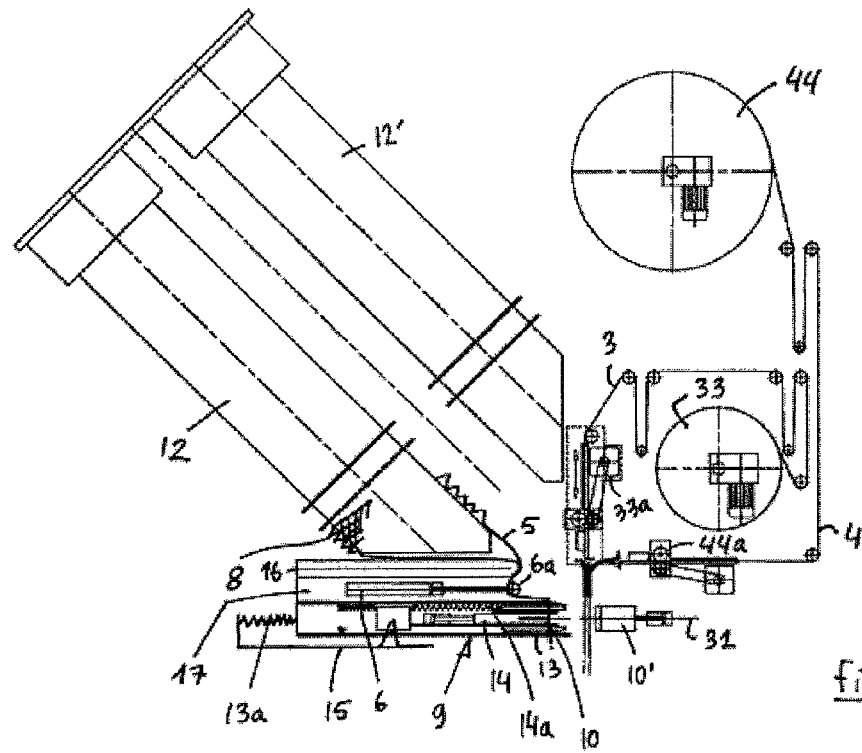
FIGS. 12 and 13 show respective schematic views of a machine for putting the process according to FIGS. 1 to 9 into practice.
Figure 13:
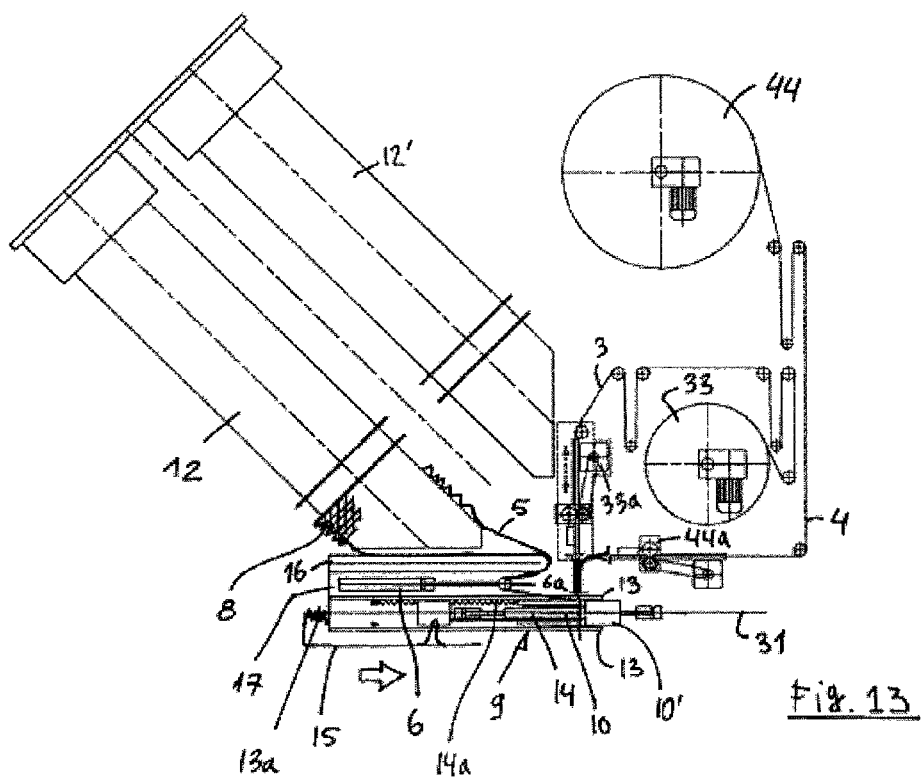

In FIGS. 12 and 13 a machine 1 for putting the described process into practice has been depicted. Said machine 1 has been depicted in two different situations, each of them corresponding to an instant prior to reaching the situation depicted in FIGS. 2 and 3, respectively, of the process.

The machine 1 comprises an extractor 6 of mesh 5, for drawing longitudinal sections of mesh from the tubular mesh storage 8, and two strip dispensers 33a and 44a for drawing longitudinal sections of the strips 3 and 4 from their corresponding storages 33 and 44, in the form of a roll, arranged such that the drawn sections of strip are hanging and opposite to the section of drawn mesh. The mentioned tubular filling means 12 of the products to be packaged and the storages 33 and 44 of the strips 3 and 4 are arranged assembled on the frame of the machine 1.

The machine 1 further comprises a joint compression and transverse constriction device 9 for corresponding longitudinal sections of mesh 5 and of the strip 3 and 4; an attachment device 10 for inseparably attaching the compressed sections of mesh 5 and of the mentioned strips 3 and 4; a cutting device (not shown) for transversely cutting the attachment of both longitudinal sections of mesh 5 and the strips 3 and 4 along the cutting line 31; and tubular filling means 12 for filling the chosen bags in formation the first end of which has been closed.

The joint compression and transverse constriction device 9 for the longitudinal section of drawn mesh 5 and of the longitudinal section of the strips 3 and 4 comprises conventionally a set of constricting plates 13, determining a recess at a considerably right angle, capable of moving towards the mesh 5 such that it concentrates the mesh in the vertex of the recess, constricting it. In the situation depicted in FIG. 12, it is observed that the mesh 5 drawn from the storage 8 has been moved from the vertical projection of the mouth of the tubular filling means 12 due to the movement of the set of plates 13. Once the constricted mesh 5, pushed by the set of plates 13, reaches the strips 3 and 4, a central compressor element 14 intervenes to apply by pressure the mentioned longitudinal sections of mesh and of strip against matrix or support means, not shown, as shown in FIG. 13.

In order for the set of plates 13 and the central compressor element 14 to be progressively and consecutively driven for collecting and dragging the mesh 5 in their movement until reaching the strips 3 and 4, in a first step of action, and for compressing the longitudinal sections of mesh 5 and of the strips 3 and 4, in a second step of action, the set of plates 13 and the central compressor 14 are assembled on a carriage 15, movable with respect to the frame of the machine 1 according to a horizontal back and forth movement, which are longitudinally movable in the direction of movement of the carriage 15, subjected to the action of respective elastic means 13a and 14a forcing them to adopt corresponding initial and predetermined positions of action, slightly shifted in relation to one another. When the carriage 15 advances in the direction indicated by the arrow of FIG. 13, the set of plates 13 and the central compressor 14 act sequentially, their movement likewise being stopped when they reach corresponding end-of-action stops (not shown) as the carriage 15 advances towards them, the respective elastic means 13a and 14a then being compressed. It can be seen in FIG. 13 that the mentioned elastic means 13a and 14a are compressed with respect to the shape adopted in FIG. 12, before the set of plates 13 and the central compressor 14 reach the end-of-action stops. After the attachment operation has been carried out, the carriage 15 withdraws, the set of plates 13 and the central compressor 14 successively recovering their initial positions due to the effect of the elastic means 13a and 14a.

In the machine 1 of FIGS. 12 and 13, the attachment device 10 is also assembled on the carriage 15 which is longitudinally movable in the direction of movement of the carriage 15, in this case by means of a hydraulic or pneumatic drive. The attachment device 10 comprises a welding head formed by a sonotrode 10, suitable for triggering the melting of the materials forming the mesh 5 and the strips 3 and 4, associated to the counter-sonotrode 10' assembled fixedly in the frame of the machine 1.

In relation to the extractor device 6 of the mesh 5, the latter comprises a drawing bar 6a, transversely arranged with respect to the mesh 5, movable according to a back and forth movement on a horizontal plane, controlled by a hydraulic or pneumatic cylinder. It is seen in FIG. 13 that the drawing bar 6a has been moved from the position that it occupied in FIG. 12, dragging a new drawn portion of mesh 5 from the storage 8 in its movement, which will form part of the body of the bag to be made.

In FIGS. 12 and 13 it is furthermore seen that the carriage 15 is provided with an essentially horizontal and flat upper platform 16, immediately below which there is arranged a cavity 17 housing the extractor device 6 and the drawing bar 6a when the carriage 15 is moved towards the strips 3 and 4.

The carriage 15 is drivable in a synchronised manner with the extractor 6 of mesh 5 and the two strip dispensers 33a and 44a for drawing longitudinal sections of the strips 3 and 4 from their corresponding storages 33 and 44, such that every time that the carriage 15 withdraws in the direction indicated by the arrows of FIGS. 3 and 8, the extractor 6 of mesh 5 and the two dispensers 33a and 44a are driven to stretch a new empty portion of mesh 5 and to arrange new sections of the strips 3 and 4 in the field of action of the attachment device 10, respectively, before the carriage 15 restarts its movement towards the mentioned strips 3 and 4, as indicated by the arrows of FIGS. 2, 7 and 13.

The invention claimed is:

1. A process for the formation and the filling of bags, applicable to tubular mesh bags closed at their two ends and provided with a handle formed by at least one oblong and flexible element for the attachment between said ends, wherein, from a tubular mesh storage and at least one continuous first strip storage for the formation of the handle, the process comprises the operations of:
   a) constricting a section of a portion of mesh previously drawn from the tubular mesh storage and inseparably attaching the constricted section to a section of a portion of a first strip previously drawn from the first strip storage, determining at least one securing area between the section of the mesh and the section of the first strip, to make a first closed end of the bag to be formed, still empty, and a second end of an immediately previous bag still in formation, already filled;
   b) drawing from the tubular mesh storage a new empty portion of the tubular mesh;
   c) transversely cutting both attached sections of the mesh and of the first strip such that on both sides of the cut made there is a securing area, or a longitudinal section thereof, sufficient for assuring that accidental opening of the bags does not occur, a first already formed filled bag being separated from a first following bag in formation, a first closed end of which is gripped by the first strip during the entire following process of filling and formation of said bags;
   d) drawing from the first strip storage a new portion of the first strip, with a length smaller than a length of the empty portion of the tubular mesh drawn in operation b);
   e) filling the new empty portion of the mesh contiguous to the first closed end of the first following bag in formation with products to be packaged, through a non-constricted end of the first following bag in formation and such that the products force the drawn portion of the tubular mesh to adopt a U-shape due to an effect of a weight of the products,
   wherein most or all of the products being arranged at a level below the first closed end of the first following bag in formation which remains gripped by the first strip;
   f) constricting a new section of the tubular mesh drawn from the mesh storage and inseparably attaching the new section of the tubular mesh to a new section of the first strip drawn from the first strip storage, determining at least one new securing area between both new sections of the mesh and of the strip, to make a new first closed end of a following bag to be formed, still empty, and a second closed end of the first following bag in formation, already filled;
   g) drawing from the tubular mesh storage another empty portion of the tubular mesh, corresponding to a length of the following bag to be formed;
   h) transversely cutting the new attached sections of the mesh and of the first strip such that on both sides of the cut made there is another securing area, or another longitudinal section thereof, sufficient for assuring that accidental opening of the bags does not occur, a second already formed filled bag being separated from a second following bag in formation, the first closed end of which is suspended from the first strip during the entire following process of filling and formation of said bag; and
   i) repeating operations d) to h) in a continuous process for the successive and continued formation and filling of successive bags.

2. The process according to claim 1, wherein there is a third storage of a second continuous strip such that in operation a) a section of the second strip is superimposed on the section of the first strip and both are attached to the constricted section of the tubular mesh, determining the at least one securing area between the sections of the mesh, of the first and of the second strips; in operation c) the mentioned section of the second strip is cut together with the mesh and the first strip, the already formed filled bag being separated from the following bag now in formation; in operation d) a portion of the second strip is also drawn from the corresponding storage; in operation f) a new section of the second strip is superimposed on the new section of the first strip and both are attached to the new constricted section of tubular mesh, determining at least one new securing area between the sections of the mesh, of the first and of the second strips; and in operation h) the mentioned new section of the second strip is cut together with the mesh and the first strip, the already formed filled bag being separated from the following bag now in formation.

3. The process according to claim 2, wherein the length of the portion of the first strip drawn in operation d) is different from a length of the portion of the second drawn strip.

4. The process according to claim 3, wherein the length of the portion of the first strip drawn in operation e) is smaller than the length of the second strip, and said first strip is arranged between the constricted mesh and the second strip.

5. The process according to claim 1, wherein in operation b) the new empty portion of tubular mesh corresponding to the length of the bag is drawn from the tubular mesh storage.

6. The process according claim 1, wherein in operation b) the new empty portion of tubular mesh with a length smaller than the length of the following bag in formation is drawn from the tubular mesh storage, and in operation e) the products to be packaged fall by gravity into the following bag in formation and cause, upon contacting the new portion of mesh, the new empty portion of mesh, complementary to the already drawn portion, to be drawn from the tubular mesh storage.

7. The process according to claim 1, wherein in each attachment operation two welds separated from each other are made, two securing areas between the mesh and the strip or strips being determined.

8. The process according to claim 7, wherein in operations c) and h) the mesh and the strips-are cut through a point comprised between the two welds.

* * * * *